United States Patent [19]

Pero et al.

[11] Patent Number: 5,738,941

[45] Date of Patent: Apr. 14, 1998

[54] FREE FLOWING CRUMB RUBBER COMPOSITION

[75] Inventors: Gregory David Pero, Norton; Michael Kenneth Stockdale, Akron; both of Ohio

[73] Assignee: The Goodyear Tire & Rubber Comoany, Akron, Ohio

[21] Appl. No.: 629,285

[22] Filed: Apr. 8, 1996

[51] Int. Cl.$^6$ .............................. B44D 1/02; B44D 1/094
[52] U.S. Cl. ................. 428/407; 427/222; 264/178 R; 264/180
[58] Field of Search ................. 428/407; 427/222; 264/178 R, 180

[56] References Cited

U.S. PATENT DOCUMENTS

| | | | |
|---|---|---|---|
| 3,528,841 | 9/1970 | Donaldson et al. | 427/222 |
| 3,779,785 | 12/1973 | Stiles et al. | 428/407 |

*Primary Examiner*—Frederick Krass
*Attorney, Agent, or Firm*—Alvin T Rockhill

[57] ABSTRACT

By utilizing the process of the present invention, a free-flowing crumb rubber composition can be easily prepared on a commercial scale. This invention more specifically discloses a process for preparing a free-flowing crumb rubber composition which comprises the steps of:

(1) extruding a rubbery polymer into a wax emulsion; wherein the rubbery polymer is extruded into pellets having a diameter which is within the range of about 1 mm to about 15 mm; wherein the wax emulsion is comprised of about 35 weight percent to about 89 weight percent water, from about 10 weight percent to about 50 weight percent of a wax, and from about 1 weight percent to about 15 weight percent of an emulsifier; wherein the wax has a melting point which is within the range of about 40° C. to about 175° C.; and wherein the wax emulsion is at a temperature which is within the range of about 5° C. to about 70° C.;

(2) agitating the wax emulsion containing the rubbery polymer to produce a wax-coated rubbery polymer;

(3) separating the wax-coated rubbery polymer from the wax emulsion so as to recover a wet wax-coated rubbery polymer; and (4) drying the wax-coated rubbery polymer in a gas medium under forced motion to produce the free-flowing crumb rubber composition, wherein the gas medium is at a temperature which is within the range of about 10° C. to about 50° C.

21 Claims, No Drawings

FREE FLOWING CRUMB RUBBER COMPOSITION

BACKGROUND OF THE INVENTION

It is often convenient for synthetic rubbers to be in the form of free-flowing crumb. In the case of free-flowing crumb rubber, the rubber is in the form of small discrete particles or pellets. These pellets can flow freely which makes them easy to handle and process. However, synthetic rubbers which are made by emulsion, solution or suspension polymerization techniques tend to be tacky. Consequently, pellets of such synthetic elastomers usually agglomerate during storage. This in turn destroys the free-flowing nature of the crumb rubber and makes it more difficult, if not impossible, to handle and process.

The agglomeration problem associated with pellets of rubbery polymers is sometimes overcome by coating the pellets with a fused resinous partitioning agent, such as polystyrene, polymethylmethacrylate, polyacrylonitrile, polyvinylchloride (PVC) or polyethylene. For instance, U.S. Pat. No. 3,813,259 refers to the use of polymethylmethacrylate as a partitioning agent and U.S. Pat. No. 4,271,213 described the use of a mixture of styrene-butadiene copolymer resin and polymethylmethacrylate resin as a partitioning agent.

In some cases, inorganic partitioning agents, such as talc, are utilized as partitioning agents for crumb rubber. However, dry powders tend to settle out during coating applications which lead to undesirable inconsistencies. Also, in some applications, inorganic or polymeric partitioning agents cannot be tolerated. For example, the presence of talc cannot be tolerated in nitrile rubber used to make electrical cable because it can interfere with useful functional service life.

There is currently a need for an improved technique to make highly consistent free-flowing crumb rubber compositions. It is also important for such a technique to be commercially viable and to be easily implemented on an industrial basis. There is a further need to eliminate inorganic and polymeric partitioning agents from free-flowing crumb rubber compositions.

SUMMARY OF THE INVENTION

By utilizing the technique of this invention, free-flowing crumb compositions can easily be made on a commercial basis. The technique of this invention also eliminates the need to utilize inorganic or polymeric partitioning agents in free-flowing crumb rubber compositions.

The subject invention more specifically discloses a process for preparing a free-flowing crumb rubber composition which comprises the steps of:

(1) extruding a rubbery polymer into a wax emulsion; wherein the rubbery polymer is extruded into pellets having a diameter which is within the range of about 1 mm to about 15 mm; wherein the wax emulsion is comprised of about 35 weight percent to about 89 weight percent water, from about 10 weight percent to about 50 weight percent of a wax, and from about 1 weight percent to about 15 weight percent of an emulsifier; wherein the wax has a melting point which is within the range of about 40° C. to about 175° C.; and wherein the wax emulsion is at a temperature which is within the range of about 5° C. to about 70° C.;

(2) agitating the wax emulsion containing the rubbery polymer to produce a wax-coated rubbery polymer;

(3) separating the wax-coated rubbery polymer from the wax emulsion so as to recover a wet wax-coated rubbery polymer; and (4) drying the wax-coated rubbery polymer in a gas medium under forced motion to produce the free-flowing crumb rubber composition, wherein the gas medium is at a temperature which is within the range of about 10° C. to about 50° C.

The present invention further reveals a free-flowing crumb rubber composition which is comprised of pellets of a rubbery polymer having a diameter which is within the range of about 1 mm to about 15 mm, wherein the surface of the pellets of rubbery polymer is coated with a wax having a melting point which is within the range of about 40° C. to about 175° C., and wherein the free-flowing crumb rubber composition contains from about 1 weight percent to about 10 weight percent of the wax.

DETAILED DESCRIPTION OF THE INVENTION

The technique of this invention can be used to make a free-flowing crumb of virtually any type of rubbery polymer. In most cases, the rubbery polymer will be comprised of repeat units which are derived from one or more conjugated diolefin monomers, such as 1,3-butadiene or isoprene. It can also contain repeat units which are derived from one or more monomers which are copolymerizable with the conjugated diolefin monomer, such as acrylonitrile, styrene, α-methylstyrene or n-butylacrylate. Some representative examples of rubbery polymers which can be used include: polybutadiene rubber, polyisoprene rubber, styrene-butadiene rubber (SBR), styrene-isoprene rubber (SIR), isoprene-butadiene rubber (IBR), styrene-isoprene-butadiene rubber (SIBR), nitrile rubber (NBR) or carboxylated nitrile rubber.

In the first step of the process of this invention, the rubbery polymer is extruded into pellets. It is, of course, necessary to have previously processed the rubber into a physical form that can be fed into an extruded. For instance, bailed rubber could be processed through a Banbury mixer to put it into a physical form which can be fed into an extruder. It is important for the extruder to be operated at a speed in a manner whereby the rubber exiting the extruder is at a temperature of less than about 150° C. The temperature profile of the extruder should use temperature ranges which will allow the extrudate to be maintained at the desired temperatures. A typical temperature profile might include temperatures within the range of 100° C. to 150° C. The rubber exiting the extruder will typically be at a temperature of less than about 125° C.

The rubber will be extruded into pellets which have a diameter which is within the range of about 1 mm (millimeter) to about 15 mm. The rubber will typically be extruded into pellets having a diameter which is within the range of about 2 mm to about 10 mm. The pellets will preferably have a diameter of 4 mm to 6 mm. The pellets extruded are typically cut to a length of about 1 mm to about 15 mm. The pellets will more typically be cut to a length of about 2 mm to 10 mm and will preferably be cut to a length of about 2 mm to 6 mm.

It is preferred to utilize an underwater pelletizer. In any case, the pellets of rubbery polymer are extruded into a wax emulsion. The wax emulsion is maintained at a temperature which is within the range of about 5° C. to about 70° C. It is normally preferred for the wax emulsion to be at a temperature which is within the range of about 20° C. to about 50° C. However, it is critical for the temperature of the wax emulsion to be maintained at a temperature which is less than the melting point of the wax being employed.

The wax emulsion is comprised of water, the wax and an emulsifier. It will typically contain from about 35 weight percent to about 89 weight percent water, from about 10 weight percent to about 50 weight percent of the wax, and from about 1 weight percent to about 15 weight percent of the emulsifier. The wax emulsion will preferably contain from about 62 weight percent to about 83 weight percent water, from about 15 weight percent to about 30 weight percent of the wax, and from about 2 weight percent to about 8 weight percent of the emulsifier. The wax emulsion will preferably contain from about 69 weight percent to about 76 weight percent water, from about 20 weight percent to about 25 weight percent of the wax, and from about 4 weight percent to about 6 weight percent of the emulsifier.

The wax will have a melting point which is within the range of about 40° C. to about 175° C. It will preferably have a melting point which is within the range of about 50° C. to about 150° C. and will most preferably have a melting point which is within the range of about 60° C. to about 70° C.

The wax is an ester of a high molecular weight fatty acid with a high molecular weight alcohol other than glycerol. It will typically be a mineral wax selected from the group consisting of paraffin waxes, microcrystalline waxes, oxidized microcrystalline waxes, montan waxes, hoechst waxes and ozokerite waxes. Paraffin waxes are normally preferred.

The emulsifier can be virtually any type of anionic emulsifier or nonionic emulsifier. Some representative examples of types of anionic surfactants which can be utilized include carboxylates, alkylbenzene sulfonates, alkane sulfonates, α-olefin sulfonates, fatty alcohol sulfates and oxo-alcohol sulfates. Of the anionic emulsifiers alkyl benzene sulfonates, fatty alcohol sulfates and oxo-alcohol ether sulfates are preferred.

It is generally preferred for the emulsifier to be a nonionic emulsifier. Some representative examples of types of nonionic surfactants which can be utilized include alkylphenol ethoxylates, fatty-alcohol polyethyleneglycol ethers, oxo-alcohol polyethyleneglycol ethers, ethylene oxide polymers, propylene oxide polymers and fatty alcohol polyglycol ethers. Ethoxylated alcohols are a highly preferred class of nonionic emulsifiers.

The wax emulsion containing the rubbery polymer will be agitated so as to thoroughly mix the wax and the rubbery polymer pellets together. This mixing allows for the wax to coat the surface of the rubbery polymer. During this mixing step, the rubbery polymer will by coated with about 1 weight percent to about 10 weight percent wax, based upon the total weight of the wax-coated rubbery polymer pellets. More typically, the rubbery polymer will be coated with about 2 weight percent to about 5 weight percent of the wax.

The wax-coated rubbery polymer pellets are then separated from the wax emulsion. This can be done by simply pouring the wax emulsion containing the rubbery polymer through a screen which is small enough to catch the rubbery pellets. The removal of the wax emulsion from the wax-coated rubbery pellets can be facilitated by centrifugation.

The wet wax-coated rubbery pellets which are recovered from the wax emulsion generally contain less than about 2 percent water. These wet pellets are then dried to further reduce the level of water present to less than about 0.5 percent. It is highly preferred for this drying step to be carried out under forced motion. The forced motion must be sufficient to keep the wax-coated rubbery polymer pellets from agglomerating prior to being dried. The drying will typically be accomplished by passing a gas medium through a bed of the wax-coated rubbery polymer pellets. In one embodiment of this invention, the forced motion is provided by passing the gas medium through the bed of wax-coated rubbery polymer pellets at a velocity which is sufficient to fluidize the bed of wax-coated rubbery polymer pellets. Higher drying temperatures promote faster drying which, of course, reduces the time needed for drying. However, high temperatures can lead to agglomeration which limits the drying temperature which can be utilized. The drying temperature employed will typically be within the range of about 10° C. to about 50° C. It is normally preferred to utilize a drying temperature which is within the range of about 20° C. to about 40° C. The drying temperatures referred to herein are the temperatures of the gas medium used in the drying step. The gas medium utilized will typically be air. However, other gases such as nitrogen can also be utilized. It is generally advantageous for the gas medium to be dried and heated prior to utilization in the drying step.

The free-flowing crumb rubber composition made by this process is comprised of pellets of a rubbery polymer having a diameter which is within the range of about 1 mm to about 15 mm, wherein the surface of the pellets of rubbery polymer is coated with a wax having a melting point which is within the range of about 40° C. to about 175° C., and wherein the free-flowing crumb rubber composition contains from about 1 weight percent to about 10 weight percent of the wax. This free-flowing crumb rubber composition is free of inorganic materials and polymeric materials other than the rubbery polymer itself. These free-flowing crumb rubber compositions should be stored at a temperature of less than about 60° F. (16° C.) to prevent agglomerating from occurring. The free-flowing crumb rubber composition will preferably be stored at a temperature of less than 40° F. (4° C.).

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment, free-flowing nitrile rubber crumb was prepared by utilizing the technique of this invention. In the procedure used, 125 pounds (56.7 kg) of Chemigum® N615B nitrile rubber from The Goodyear Tire & Rubber Company was fed into a #4 Banbury mixer and was mixed for about 2 to 5 minutes. This nitrile rubber contained about 33 percent bound acrylonitrile. This mixing step was conducted in a manner whereby the final mixing temperature was kept below about 300° F. (149° C.). The nitrile rubber was then fed into an extruder-pelletizer and was extruded at a rate of 2500 pounds per hour (1134 kg/hour) through a multihole die. The die holes had a diameter of one-eighth inch (3 mm).

The nitrile rubber being extruded was pelletized into an aqueous wax emulsion. The aqueous wax emulsion was made by diluting 100 parts of Petrolite® 01 dispersion with 100 parts of water. The aqueous wax emulsion contained 22.5 weight percent of a paraffin wax having a melting point of 64° C., 2.5 percent of an ethoxylated alcohol, and 75 weight percent water. The temperature of the wax emulsion was controlled to stay below 50° C. and was agitated to mix the nitrile rubber pellets throughout the wax emulsion. The wax emulsion containing the nitrile rubber pellets was then fed into a centrifugal dryer which reduced the water content of the nitrile rubber pellets to less than 2 percent. The nitrile rubber pellets were then dried in a ribbon blender at a temperature of 100° F. (38° C.) to further reduce the moisture content of the nitrile rubber pellets which were then packaged in 50-pound (22.7 kg) boxes for storage and subsequent utilization. The crumb rubber composition made remained free-flowing after several months of storage in refrigeration at a temperature of less than 40° F. (4° C.).

EXAMPLE 2

In this experiment, a free-flowing nitrile rubber crumb was prepared utilizing a wax having a melting point of 138° C. In the procedure used, 125 pounds (56.7 kg) of Chemigum® N615B nitrile rubber from The Goodyear Tire & Rubber Company was fed into a #4 Banbury mixer and was mixed for about 2 to 5 minutes. This nitrile rubber contained about 33 percent bound acrylonitrile. This mixing step was conducted in a manner whereby the final mixing temperature was kept below about 300° F. (149° C.). The nitrile rubber was then fed into an extruder-pelletizer and was extruded at a rate of 2500 pounds per hour (1134 kg/hour) through a multihole die. The die holes had a diameter of one-eighth inch (3 mm).

The nitrile rubber being extruded was pelletized into an aqueous wax emulsion. The aqueous wax emulsion contained 20 weight percent of a paraffin wax having a melting point of 138° C., 2 weight percent of an ethoxylated alcohol, and 78 weight percent water. The temperature of the wax emulsion was controlled to stay below 50° C. and was agitated to mix the nitrile rubber pellets throughout the wax emulsion. The wax emulsion containing the nitrile rubber pellets was then fed into a centrifugal dryer which reduced the water content of the nitrile rubber pellets to less than 2 percent. The nitrile rubber pellets were then dried in a ribbon blender at a temperature of 100° F. (38° C.) to further reduce the moisture content of the nitrile rubber pellets which were then packaged in 50-pound (22.7 kg) boxes for storage and subsequent utilization. The crumb rubber composition made remained free-flowing after several months of storage in refrigeration at a temperature of less than 40° F. (4° C.).

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for preparing and storing a free-flowing crumb rubber composition which comprises the steps of:
   (1) extruding a rubbery polymer into a wax emulsion; wherein the rubbery polymer is extruded into pellets having a diameter which is within the range of about 1 mm to about 15 mm; wherein the wax emulsion is comprised of about 35 weight percent to about 89 weight percent water, from about 10 weight percent to about 50 weight percent of a wax, and from about 1 weight percent to about 15 weight percent of an emulsifier, wherein said percentages are based on the total weight of said wax emulsion; wherein the wax has a melting point which is within the range of about 40° C. to about 175° C.; wherein the wax emulsion is at a temperature which is within the range of 20° C. to 50° C.; wherein the wax emulsion is at a temperature which is less than the melting point of the wax; and wherein the rubbery polymer is selected from the group consisting of polybutadiene rubber, polyisoprene rubber, styrene-butadiene rubber, styrene-isoprene rubber, isoprene-butadiene rubber, styrene-isoprene rubber, styrene-isoprene-butadiene rubber, nitrile rubber and carboxylated nitrile rubber;
   (2) agitating the wax emulsion containing the rubbery polymer to produce a wax-coated rubbery polymer;
   (3) separating the wax-coated rubbery polymer from the wax emulsion so as to recover a wet wax-coated rubbery polymer;
   (4) drying the wax-coated rubbery polymer in a gas medium under forced motion to produce the free-flowing crumb rubber composition, wherein the gas medium is at a temperature which is within the range of about 10° C. to about 50° C.; and
   (5) storing the free-flowing crumb rubber composition at a temperature of less than about 16° C.

2. A process as specified in claim 1 wherein the emulsifier is selected from the group consisting of anionic emulsifiers and nonionic emulsifiers.

3. A process as specified in claim 2 wherein the rubbery polymer extruded in step (1) is at a temperature of less than about 150° C.

4. A process as specified in claim 3 wherein the wax is a mineral wax.

5. A process as specified in claim 4 wherein the wax emulsion contains from about 62 weight percent to about 83 weight percent water, from about 15 weight percent to about 30 weight percent of the wax, and from about 2 weight percent to about 8 weight percent of the emulsifier.

6. A process as specified in claim 5 wherein the wax-coated rubbery polymer made in step (2) contains from about 1 weight percent to about 10 weight percent wax.

7. A process as specified in claim 6 wherein the wax has a melting point which is within the range of about 50° C. to about 150° C.

8. A process as specified in claim 7 wherein the emulsifier is an anionic emulsifier selected from the group consisting of carboxylates, alkylbenzene sulfonates, alkane sulfonates, α-olefin sulfonates, fatty alcohol sulfates and oxo-alcohol sulfates.

9. A process as specified in claim 7 wherein the emulsifier is a nonionic emulsifier.

10. A process as specified in claim 9 wherein the nonionic emulsifier is selected from the group consisting of alkylphenol ethoxylates, fatty-alcohol polyethyleneglycol ethers, oxo-alcohol polyethyleneglycol ethers, ethylene oxide polymers, propylene oxide polymers and fatty alcohol polyglycol ethers.

11. A process as specified in claim 9 wherein the emulsifier is an ethoxylated alcohol.

12. A process as specified in claim 9 wherein the pellets have a diameter which is within the range of about 2 mm to about 10 mm.

13. A process as specified in claim 12 wherein the mineral wax is selected from the group consisting of paraffin waxes, microcrystalline waxes, oxidized microcrystalline waxes, montan waxes, hoechst waxes and ozokerite waxes.

14. A process as specified in claim 13 wherein the mineral wax is a paraffin wax.

15. A process as specified in claim 14 wherein the wax emulsion contains from about 69 weight percent to about 76 weight percent water, from about 20 weight percent to about 25 weight percent of the wax, and from about 4 weight percent to about 6 weight percent of the emulsifier.

16. A process as specified in claim 15 wherein the gas medium utilized in step (4) is at a temperature which is within the range of about 20° C. to about 40° C.

17. A process as specified in claim 16 wherein the wax-coated rubbery polymer made in step (2) contains from about 2 weight percent to about 5 weight percent wax.

18. A process as specified in claim 17 wherein the wax has a melting point which is within the range of about 60° C. to about 70° C.

19. A process as specified in claim 18 wherein the pellets have a diameter which is within the range of about 4 mm to about 6 mm.

20. A process as specified in claim 19 wherein the rubbery polymer is a nitrile rubber.

21. A process as specified in claim 1 wherein the free-flowing crumb rubber composition is stored in step (5) at a temperature of less than 4° C.

* * * * *